Nov. 8, 1966
H. F. CRUZEN, JR
3,283,883
BLOCK TURNTABLE
Filed Feb. 12, 1964
3 Sheets-Sheet 1
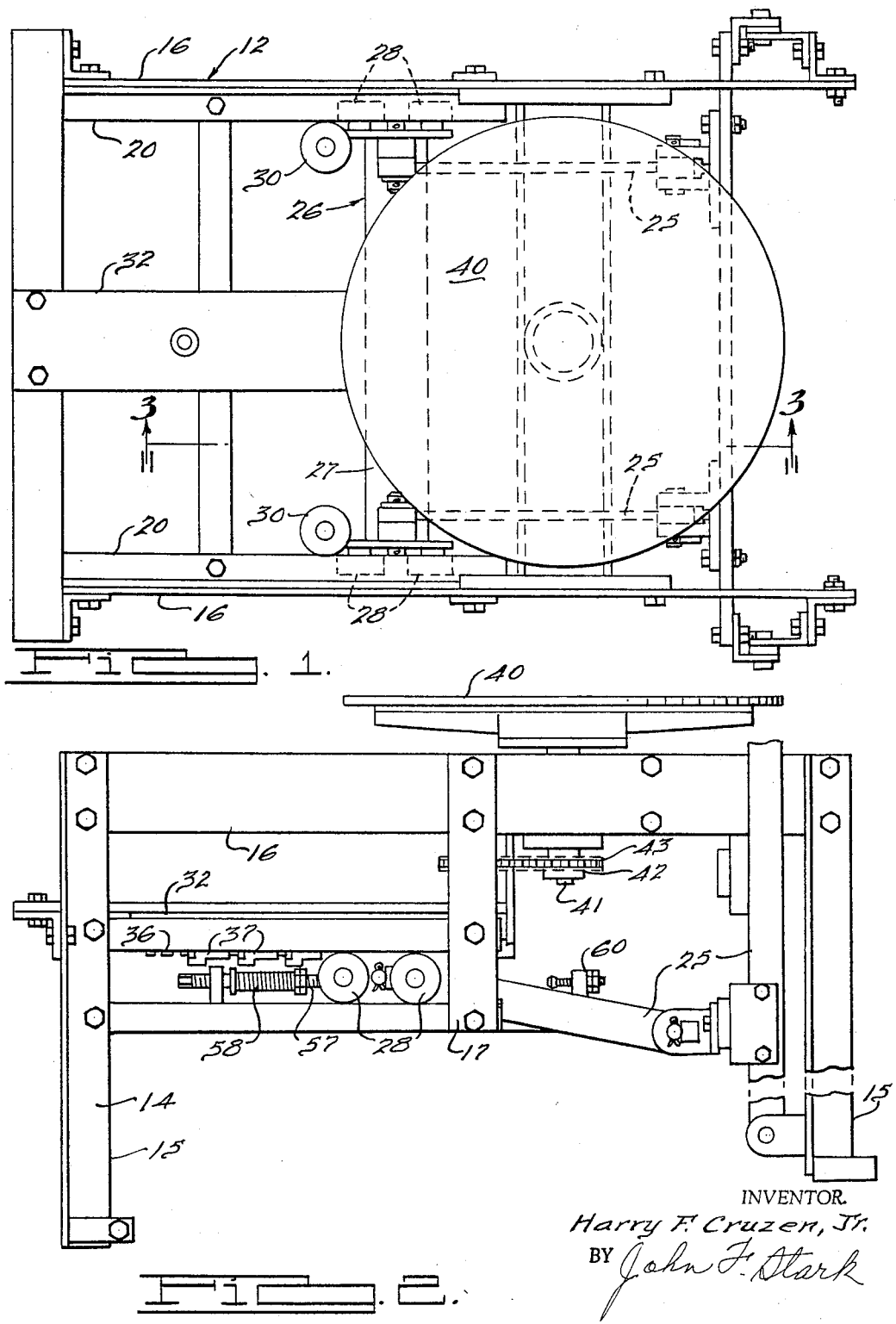
INVENTOR.
Harry F. Cruzen, Jr.
BY John F. Stark
ATTORNEY INVENTOR.
Harry F. Cruzen, Jr.
BY John F. Stark
ATTORNEY.

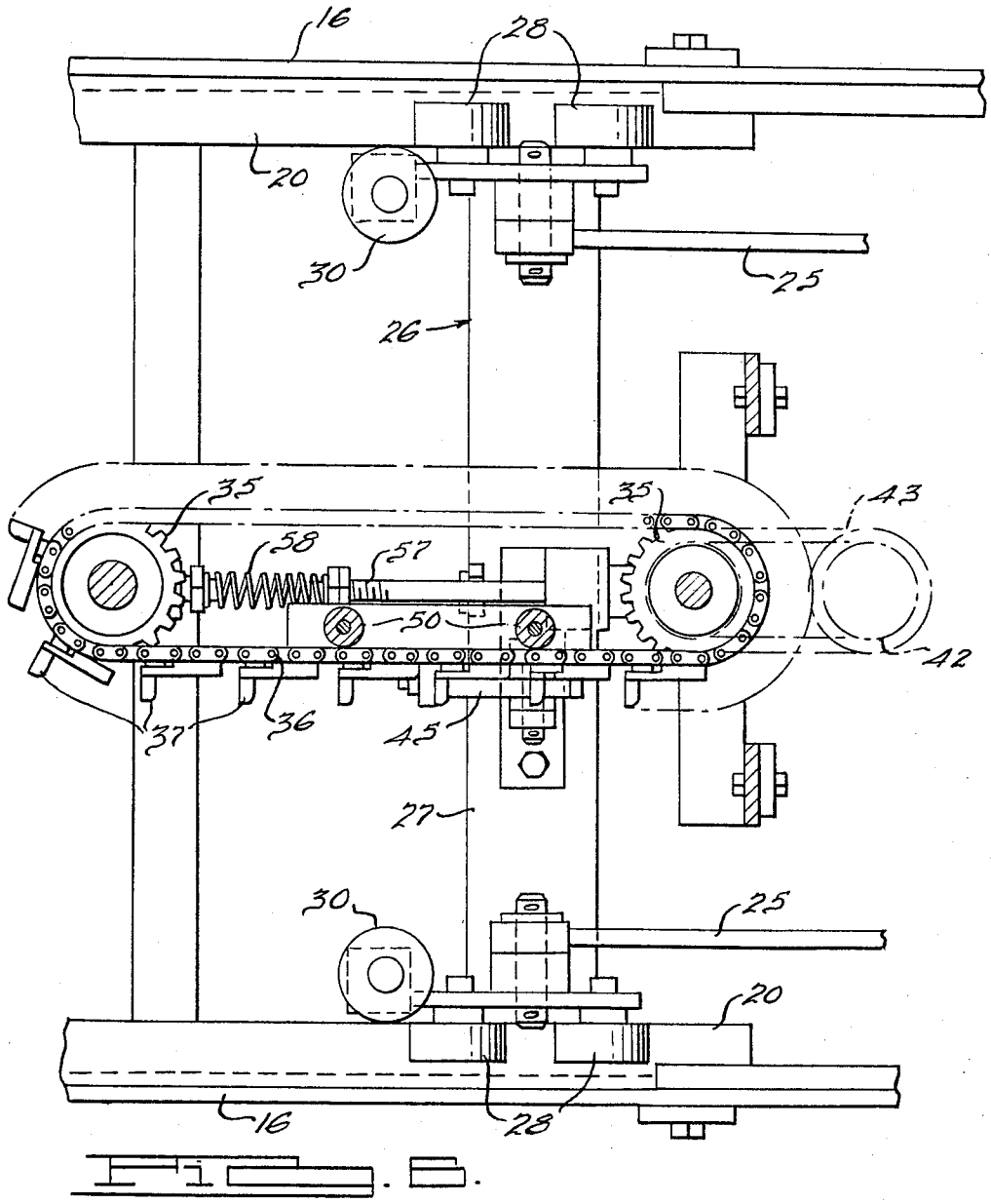

United States Patent Office 3,283,883
Patented Nov. 8, 1966

3,283,883
BLOCK TURNTABLE
Harry F. Cruzen, Jr., % Besser Company, Alpena, Mich.
Filed Feb. 12, 1964, Ser. No. 344,333
4 Claims. (Cl. 198—209)

This invention relates to powered conveyors and turntables in general and, more particularly, to building block handling equipment in which block are delivered to a powered turntable rotated thereby and moved therefrom without any manual handling or intervention of an operator.

The well known Besser Vibrapac molds building block in many popular sizes, most well known of which is the three-at-a-time 8 x 8 x 16 block. After the block are cured and returned to adjacent the power front delivery of the machine they are placed on a knee high transverse conveyor in their curing racks for rack unloading and cubing of the cured block prior to storage in a yard. Heretofore, considerable manual handling, fork lifting or operator off-bearers have been employed. With the advent of the Gray Patent #3,019,925 considerable of the manual operations became automated. As shown therein after the block were depalleted they are sent down the conveyor line cross wise three-at-a-time as swept from the pallet, i.e. with their longitudinal dimensions transverse to the conveyor. This position of the block was contrary to convenient handling for cubing purposes thereafter, either manually or automatically. Accordingly, the present invention solves this problem in a convenient manner by a novel block turntable arranged to present the block three a breast, or side by side, with their longitudinal axes parallel to the conveyor run.

A principal object of the present invention is the provision of a block turntable which may be incorporated in present block handling equipment wherein block are delivered to the block turntable, rotated ninety degrees, or any other desired amount, and moved therefrom.

Another object of the present invention is the provision in a block turntable of novel take off means and regulatable stop means for accurately controlling indexing of the turntable.

A further object of the present invention is the provision in a block turntable, of chain and sprocket driven means for the turntable actuated by a oneway dog means from the power driven means.

Other objects and advantages of the present invention will appear more fully hereinafter, it being understood that the invention consists substantially in the combination, construction, location, and general arrangement of parts, all as described in detail in the following specifications, as shown in the accompanying drawings and as fully pointed out in the appended claims.

In the drawings, like reference characters refer to similar parts in the several views and in which:

FIG. 1 is a top plan view of one embodiment of the present invention illustrating a block turntable incorporating the principles thereof;

FIG. 2 is a side elevational view of the powered turntable of FIG. 1;

FIG. 6 is a sectional plan view on the line 6—6 of FIG. 3, at enlarged scale of the sprockets, lugged chain, and one-way dog means for turntable control.

Figure 3:
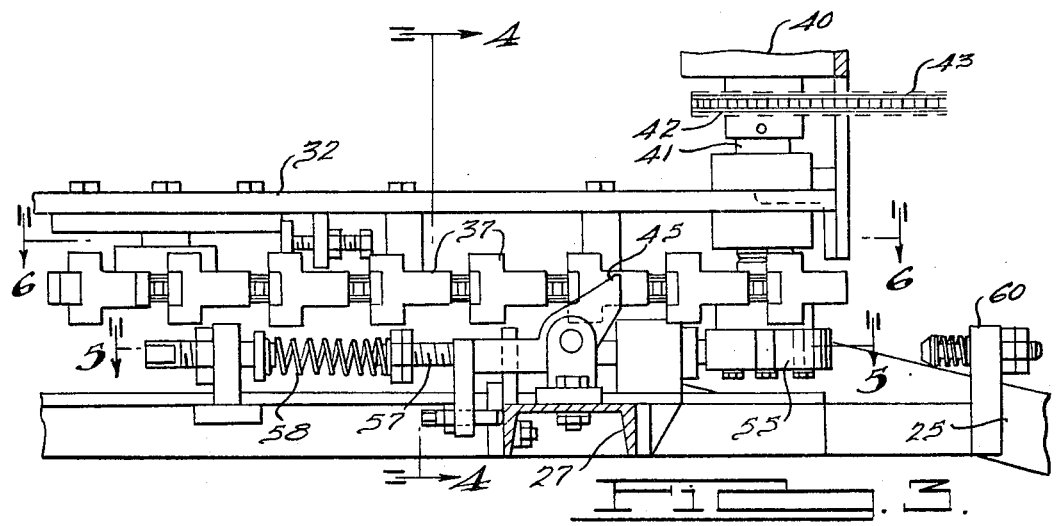
FIG. 3 is a sectional view, on the line 3—3 of FIG. 1, of the drive means for the turntable.
Figure 4:
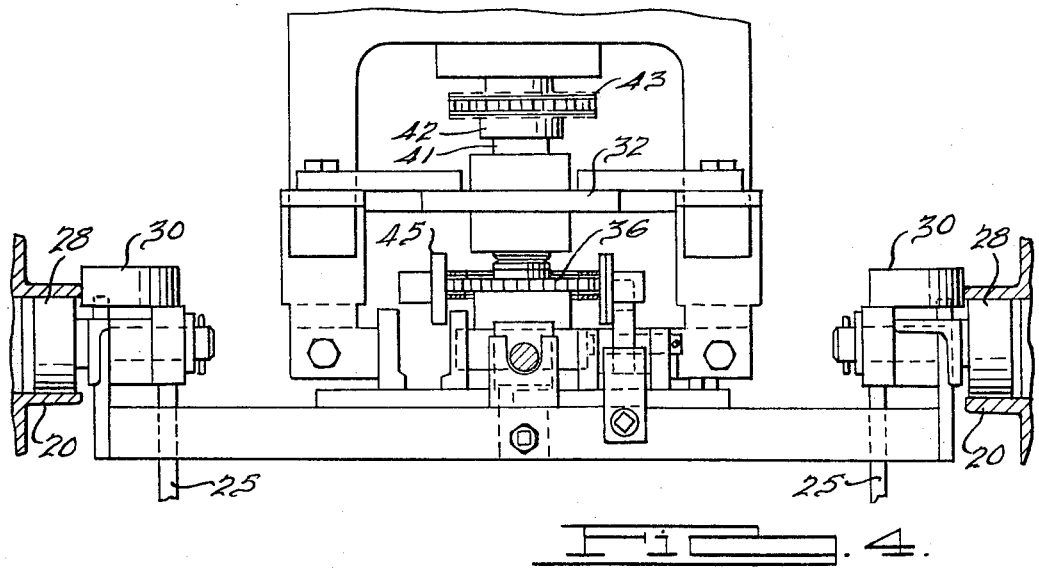
FIG. 4 is a sectional view, on the line 4—4 of FIG. 3, of another showing of the drive means.
Figure 5:
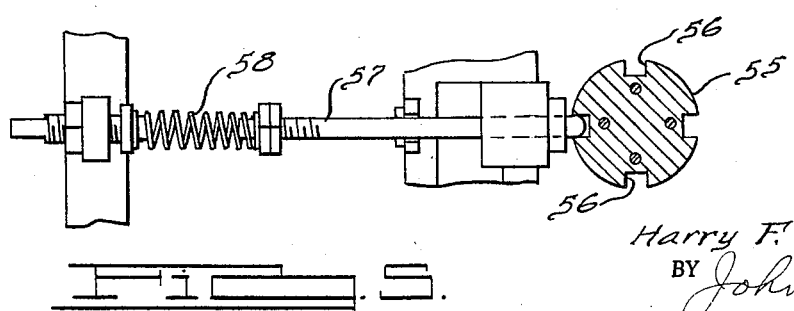
FIG. 5 is a sectional plan view, on the line 5—5 of FIG. 3, of a spring loaded stop means to arrest indexing of the turntable.

Now having reference to the drawings in FIGS. 1, 2 the conveyor turntable, generally designated 12, consists of a frame 14, including legs 15, cross pieces or stretchers 16 and intermediate support 17, together with track angles 20 supported laterally at opposite sides of the frame and extended longitudinally therein. Powered means or push bars 25, which may receive their driving power from other pieces of block handling equipment not shown, or be connected to a gearhead motor direct, are arranged to be reciprocated back and forth. Support means for move-means of the reciprocable power means 25 consists of a rollered carriage 26, including cross plate 27, with horizontal rollers 28, 28 at opposite ends thereof riding on the tracks 20, and lateral thrust guide rollers 30. A horizontal support plate 32, mounted in frame 12 between legs 15 and support 17 forms a carrier for sprockets 35 and chain 36 trained thereover. Turntable 40, and spindle or axis 41 dependent therefrom is journalled in a sprocket 42, and through chain 43 is entrained with the first chain and sprocket means 35, 36. A series of spaced lug means 37 are secured to outer periphery of chain 36, as shown in FIGS. 3 and 6. A counterweighted or balanced one-way dog means 45, is mounted on plate 27 of rollered, power driven carriage 26, in position to contact lugs 37 of chain 36 as the carriage is reciprocated back and forth. Back-up plate means 50 is supported contiguous back side of chain 36, adjacent the dog 45, to absorb thrust and prevent chain stretch as the dog does its work.

To prevent drift or override of turntable as it is indexed, there is shown in FIGS. 2, 3, 5 and 6, a stop means consisting of a star wheel or plate 55, journalled or suitably secured below sprocket 35, in this case with four quadrant openings 56 spaced 90° apart. Rod means 57, which is spring loaded by spring 58, is arranged to enter openings 56, when in alignment therewith. Suitable support means are provided in the frame for biasing the rod, spring 57, 58 and a lever actuator connected to rod 57 and power driven means 26, 27 retracts the rod 57 from opening 56, in plate 55, in timed relation to each indexing of turntable 40. Safety stop means 60 may also be provided to enter opposite side opening 56 of plate 55, as rod 57 is withdrawn, to insure no unwanted movement of turntable 40. This stop 60 is also connected to driver 27. Alternatively, to use of above stop means, a simple drag brake, either spring loaded or a wooden block, may be mounted in frame and arranged to bear against underside of turntable 40 to prevent drift or override.

In operation, three block at a time are advanced to turntable 40, from right side, as viewed in FIG. 1, with their longitudinal axes transverse to conveyor run. The three block are received on the turntable 40 and the reciprocable power driven carriage 26 through one-way dog 45, contacts chain lugs 37 and advances chain around sprockets which in turn moves turntable spindle 41 through a 90° index. The stop means 55, 56, 57 then lock table in position until the three block are swept off the turntable. Sequential movements then withdraw the stop means and the table is ready to be indexed again for reception of an additional quantity of block for successive rotation and movement therefrom.

From the foregoing it will be seen these has been disclosed a novel powered turntable for building block, to be used in conjunction with automated block handling equipment incorporating the objects and advantages aforementioned herein, as will now be evident to those skilled in this art. It will be understood, of course, that the invention is susceptible of various changes and modifications which may be made from time to time, having this disclosure in mind, without any departure from the general principles or real spirit thereof. Accordingly, it is intended to claim the same broadly, as well as specifically, as indicated in the appended claims.

What is claimed as new and useful is:

1. A block turntable comprising a frame, a turntable rotatably mounted on said frame in block-receiving position, a spindle dependent centrally from the turntable axis, chain and sprocket means mounted in said frame and trained around said spindle, powered means comprising a reciprocable rollered carriage including a one-way dog operable longitudinally in the frame, spaced lug means on said chain contactable by said one-way dog on the powered means to index said turntable a predetermined amount, spring loaded stop means associated with said chain and sprocket means to arrest turntable movement when said index is reached, said powered means operable to bias the spring of said stop means to render same inoperable in timed relation to said indexing after block have been moved off the turntable, and sequential means to continue said power indexing as additional block are presented to the turntable for successive rotation and movement therefrom.

2. A block turntable comprising a frame, a turntable rotatably mounted on said frame in block-receiving position, a spindle dependent centrally from the turntable axis, chain and sprocket means mounted in the frame and trained around said spindle, spaced track means supported longitudinally in the frame, powered means comprising a reciprocable rollered carriage operable longitudinally in said track means, a one-way dog mounted in said powered means, spaced lug means on said chain contactable by said one-way dog on the powered means to index the turntable a predetermined amount, spring loaded stop means associated with said sprocket and chain means to arrest turntable movement when said index is reached, said powered means operable to bias the spring of said stop means to momentarily render same inoperable in timed relation to said indexing after block have been moved from the turntable, and sequential means to continue said power indexing in the same direction of rotation as additional block are presented to the turntable for successive rotation and movement therefrom.

3. A block turntable comprising a frame, a turntable rotatably mounted on said frame in block-receiving position, a spindle dependent centrally from the turntable axis, chain and sprocket means mounted in the frame and trained around said spindle, spaced track means supported longitudinally in the frame, powered means comprising a reciprocable rollered carriage operable longitudinally in said track means, horizontal and lateral guide rollers to control carriage movement, a one-way dog mounted in said powered means, spaced lug means on said chain contactable by said one-way dog on the powered means to index the turntable a predetermined amount, spring loaded stop means associated with said sprocket and chain means to arrest turntable movement when said index is reached, said powered means operable to bias the spring of said stop means to momentarily render same inoperable in timed relation to said indexing after block have been moved from the turntable, and sequential means to continue said power indexing in the same direction of rotation as additional block are presented to the turntable for successive rotation and movement therefrom.

4. A block turntable comprising a frame, a turntable rotatably mounted on said frame in block-receiving position, a spindle dependent centrally from the turntable axis, chain and sprocket means mounted in the frame and trained around said spindle, spaced track means supported longitudinally in the frame, powered means comprising a reciprocable rollered carriage operable longitudinally in said track means, a one-way dog mounted in said powered means, spaced lug means on said chain contactable by said one-way dog on the powered means to index the turntable a predetermined amount, a chain back-up plate to resist chain stretch when the dog and lug contact, spring loaded stop means associated with said sprocket and chain means to arrest turntable movement when said index is reached, said powered means operable to bias the spring of said stop means to momentarily render same inoperable in timed relation to said indexing.

References Cited by the Examiner
UNITED STATES PATENTS

| | | | |
|---|---|---|---|
| 1,885,801 | 10/1932 | Chester | 108—21 |
| 1,934,835 | 10/1933 | Weiss | 198—203 |
| 2,586,630 | 2/1952 | Erland | 198—135 X |
| 2,813,638 | 10/1957 | Miller. | |
| 3,019,925 | 2/1962 | Gray | 214—310 |

MARVIN A. CHAMPION, *Primary Examiner.*